(12) United States Patent
Clelland et al.

(10) Patent No.: US 8,098,482 B2
(45) Date of Patent: Jan. 17, 2012

(54) DOUBLE LAYER CAPACITOR USING POLYMER ELECTROLYTE IN MULTILAYER CONSTRUCTION

(75) Inventors: Ian W. Clelland, Boonsboro, VA (US); Rick A. Price, Forest, VA (US); Paul R. Jelonek, Geneva, IL (US)

(73) Assignee: Illinois Tool Works Inc., Glenview, IL (US)

( * ) Notice: Subject to any disclaimer, the term of this patent is extended or adjusted under 35 U.S.C. 154(b) by 536 days.

(21) Appl. No.: 12/375,487

(22) PCT Filed: Jul. 27, 2007

(86) PCT No.: PCT/US2007/074532
§ 371 (c)(1),
(2), (4) Date: Jan. 28, 2009

(87) PCT Pub. No.: WO2008/014429
PCT Pub. Date: Jan. 31, 2008

(65) Prior Publication Data
US 2010/0002362 A1 Jan. 7, 2010

Related U.S. Application Data

(60) Provisional application No. 60/834,273, filed on Jul. 28, 2006.

(51) Int. Cl.
*H01G 9/00* (2006.01)
(52) U.S. Cl. ........ 361/502; 361/503; 361/504; 361/509; 361/512; 361/523
(58) Field of Classification Search .................. 361/502, 361/503–504, 509, 512, 303–305, 516–519, 361/523, 525, 528–529; 29/25.01, 25.03
See application file for complete search history.

(56) References Cited

U.S. PATENT DOCUMENTS 4,462,062 A 7/1984 Rayburn
(Continued)

FOREIGN PATENT DOCUMENTS

WO 0139305 A1 5/2001
(Continued)

OTHER PUBLICATIONS

U.S. Appl. No. 11/056,869; West, et al.; entitled "Electrolyte Including Silane for Use in Electrochemical Devices"; filed Feb. 10, 2005.

(Continued)

*Primary Examiner* — Nguyen T Ha
(74) *Attorney, Agent, or Firm* — Panitch Schwarze Belisario & Nadel LLP

(57) ABSTRACT

A double layer capacitor (DLC) containing at least one double layer capacitor cell is provided. Each double layer capacitor cell contains two current collectors, each containing a metallized carrier film with upper and lower planar surfaces, two thin electrode layers in direct contact with the lower and upper planar surfaces of the metallized carrier films of the first and second current collectors, and a polymer electrolyte layer in direct contact with the first and the second thin electrode layers. The polymer electrolyte is applied as a liquid which impregnates and encases the electrode layers and then solidified to form the electrolyte layer. The resulting DLC is preferably no thicker than about 20 microns, and may be as thin as 5 microns. Methods of producing a DLC and for forming a cross-linked electrolyte are also provided.

42 Claims, 5 Drawing Sheets

U.S. PATENT DOCUMENTS

| | | | |
|---|---|---|---|
| 4,488,340 | A | 12/1984 | Rayburn |
| 4,531,268 | A | 7/1985 | Rayburn |
| 4,533,813 | A | 8/1985 | Rayburn et al. |
| 4,741,876 | A | 5/1988 | Rayburn |
| 5,157,583 | A | 10/1992 | Clelland |
| 5,426,561 | A * | 6/1995 | Yen et al. ............... 361/502 |
| 5,661,629 | A * | 8/1997 | MacFarlane et al. ......... 361/505 |
| 5,912,796 | A | 6/1999 | Price |
| 6,337,383 | B1 | 1/2002 | West et al. |
| 6,426,863 | B1 | 7/2002 | Munshi |
| 6,445,566 | B2 * | 9/2002 | Watanabe et al. ........... 361/502 |
| 6,532,145 | B1 * | 3/2003 | Carlen et al. ............... 361/508 |
| 6,562,513 | B1 | 5/2003 | Takeuchi et al. |
| 6,838,211 | B2 * | 1/2005 | Banno et al. ............... 429/189 |
| 6,887,619 | B2 | 5/2005 | West et al. |
| 7,154,737 | B2 * | 12/2006 | Maruo et al. ............... 361/502 |
| 7,226,702 | B2 | 6/2007 | Oh et al. |
| 7,466,539 | B2 | 12/2008 | Dementiev et al. |
| 7,978,457 | B2 * | 7/2011 | Nagata et al. ............... 361/502 |
| 2003/0180624 | A1 | 9/2003 | Oh et al. |
| 2003/0180625 | A1 | 9/2003 | Oh et al. |
| 2004/0017647 | A1 | 1/2004 | Okamoto et al. |
| 2004/0197665 | A1 | 10/2004 | Amine et al. |
| 2004/0214090 | A1 | 10/2004 | West et al. |
| 2004/0248014 | A1 | 12/2004 | West et al. |
| 2005/0019656 | A1 | 1/2005 | Yoon et al. |
| 2005/0106470 | A1 | 5/2005 | Yoon et al. |
| 2005/0170254 | A1 | 8/2005 | West et al. |
| 2005/0231894 | A1 * | 10/2005 | Yoshida et al. ............... 361/502 |
| 2006/0008408 | A1 | 1/2006 | Ho Yoon et al. |
| 2006/0035154 | A1 | 2/2006 | West et al. |
| 2007/0065728 | A1 | 3/2007 | Zhang et al. |
| 2008/0134492 | A1 | 6/2008 | Amine et al. |

FOREIGN PATENT DOCUMENTS

| | | |
|---|---|---|
| WO | 2006061696 A2 | 6/2006 |

OTHER PUBLICATIONS

International Preliminary Report on Patentability for PCT/US2007/074532, date of mailing: Feb. 12, 2009, 10 pages.

Amine, et al., "Novel silane compounds as electrolyte solvents for Li-ion batteries"; Electrochemistry Communications 8; pp. 429-433 (2006).

Tabata, et al. "Preparation of inverse opal carbon materials and nano-structural fabrication of electrode / electrolyte interface"; Polymer Preprints Japan, 54(1); p. 1703 (May 2005). (Abstract only).

Yang, et al. "Electrochemical performances of electric double layer capacitor with UV-cured gel polymer electrolyte based on poly [(ethylene glycol) diacrylate] -poly(vinylidene fluoride) blend"; Electrochimica Acta 50(9); pp. 1813-1819 (Mar. 2005). (Abstract Only).

Toth, et al. "Influence of amorphous carbon nano-clusters on the capacity of carbon black electrodes"; Thin Solid Films 482(1-2); pp. 207-210 (Jun. 2005). (Abstract Only).

Ma, et al. "Electrochemical properties of chemically prepared manganese oxides on 3-D nano porous carbon substrates for supercapacitor application"; Meeting Abstracts , 207th Meeting of the Electrochemical Society p. 1391 (2005). (Abstract Only).

Honda, et al, "Electrochemical Characterization of Carbon Nanotube/Nanohoneycomb Diamond Composite Electrodes for a Hybrid Anode Li-Ion Battery and Super Capacitor"; Journal of the Electrochemical Society 151(4); pp. A532-A541 (2004). (Abstract Only).

Lueking, et al. "Exfoliated graphite nanofibers: Structure, adsorption, and electric double-layer capacitance"; AIChE Annual Meeting, Conference Proceedings, 05AIChE, 2005 AIChE Annual Meeting and Fall Showcase, Conference Proceedings p. 13987 (Oct. 30-Nov. 4, 2005). (Abstract Only).

Gomibuchi, et al. "Electrode properties of a double layer capacitor of nano-structured graphite produced by ball milling under a hydrogen atmosphere"; Carbon 44(5); pp. 983-988 (Apr. 2006). (Abstract Only).

Lee, et al. "Electric double-layer capacitance of microporous carbon nano spheres prepared through precipitation of aromatic resin pitch"; Journal of Power Sources 139(1-2); pp. 379-383 (Jan. 2005). (Abstract Only).

Sivakumar, et al. "Poly(o-toluidine) for carbon fabric electrode modification to enhance the electrochemical capacitance and conductivity"; Journal of Power Sources 144(1); pp. 295-301 (Jun. 2005). (Abstract Only).

Park, et al. "Synthesis of carbon nanotubes on metallic substrates by a sequential combination of PECVD and thermal CVD"; Carbon 41(5); pp. 1025-1029 (2003). (Abstract Only).

Wu, et al. "Physical and electrochemical characterization of activated carbons prepared from firwoods for supercapacitors"; Journal of Power Sources 138(1-2); pp. 351-359 (Nov. 2004). (Abstract Only).

"Super Battery"; ScienCentralNews, www. sciencentral.com/articles/view (Feb. 12, 2007). printed on Feb. 12, 2007 (2 Pages).

Barbieri, et al. "Capacitance limits of high surface area activated carbons for double layer capacitors"; Carbon 43; pp. 1303-1310 (2005). (Abstract Only).

Doeff, et al. "Thin Film Rechargeable Room Temperature Batteries Using Solid Redox Polymerization Electrodes"; Journal of the Electrochemical Society, 139(7); pp. 1808-1812 (Jul. 1992). (Abstract Only).

Arepalli, et al. "Carbon-Nanotube-Based Electrochemical Double Layer Capacitor Technologies for Spaceflight Applications"; JOM (Dec. 2005). (One Page Only—p. 26).

"Solicore—Thin, Flexible Batteries for Smart Cards, RFID, and Medical Devices"; www.solicore.com/tech printed on Jun. 29, 2005. (One Page Only).

"Dry Solid Polymer Electrolyte (DSPE) Technology"; VoltaFlex, White Paper #1 (Oct. 2003). (One Page Only).

Shukla, et al. "Electrochemical supercapacitors: Energy storage beyond batteries"; Current Science, 79(12); p. 1656 (Dec. 2000). (One Page Only).

* cited by examiner

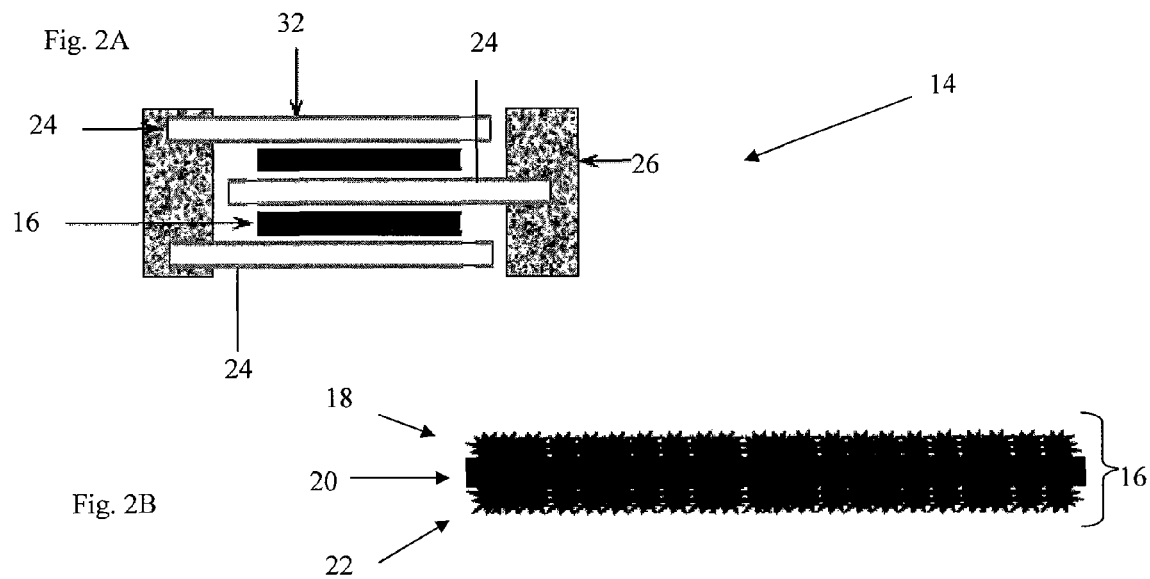
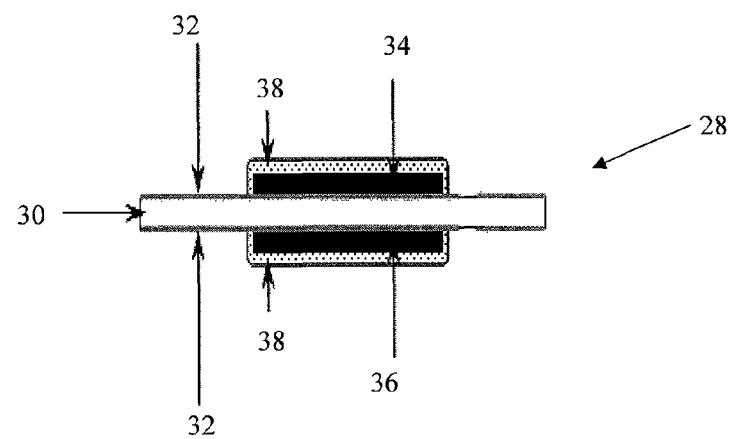

DOUBLE LAYER CAPACITOR USING POLYMER ELECTROLYTE IN MULTILAYER CONSTRUCTION

CROSS-REFERENCE TO RELATED APPLICATIONS

This application claims priority to U.S. Provisional Patent Application No. 60/834,273, filed Jul. 28, 2006, the disclosure of which is herein incorporated by reference in its entirety.

BACKGROUND OF THE INVENTION

The present invention relates to capacitors and more particularly to a double layer capacitor having a polymer electrolyte layer. Capacitors are electronic devices or components which store electrical charge. Capacitors contain two conductive electrodes or plates, each of which stores an opposite charge, separated by an insulator or dielectric. The charge is stored at the surface of the plates at the boundary with the dielectric.

There are several different types of capacitors. A simple plate capacitor typically contains two conducting plates which sandwich an insulating medium. For example, aluminum electrolytic capacitors contain an aluminum foil cathode, a layer of aluminum oxide (dielectric) and electrolytic capacitor paper. The capacitance C of the capacitor is equal to KeA/d, where A is the effective area which is common to the two conducting plates, e is the permittivity of free space, d is the distance separating the two plates, and K is the dielectric constant of the insulating medium.

A double layer capacitor (DLC) has a more complex "sandwich" structure, as shown in FIGS. 1 and 1A (prior art). This type of capacitor 2 is based on highly porous carbon electrodes 6 and 8 which become electrically charged to positive or negative when connected to a voltage source. The charged carbon then attracts oppositely charged ions from the electrolyte solution 10, which move through a paper or semi-permeable membrane separator 12 as necessary to get to the appropriately charged carbon. The ions insinuate themselves into the available surface area of the porous material. The current collectors 4 are electrically conductive media that facilitate the transfer of electrons in and out of the point contact electrodes to the termination media of the capacitor cell. Such an arrangement provides the two features needed for high capacitance: electrodes with very large surface area and charges which are separated by very small distances, since capacitance depends directly on area and indirectly on distance.

A main difference between aluminum electrolytic capacitors and DLCs is the nature of the dielectric and the resulting method of electromotive force. Rather than using aluminum oxide as the dielectric, DLCs utilize the naturally occurring electrical double layer effect as the dielectric. That is, when an electric potential is applied to the electrode, a potential difference is created at the electrode-electrolyte interface. This electrostatic interface consists of a double layer between ions in the electrolyte and the electronic charges on the electrodes. When positively charged electrolyte ions form a layer on the surface of the negative electrode, electrons beneath the surface pair up with them. Similarly, at the positive electrode, holes pair up with negative ions, forming a second electronic double layer that is itself also a capacitor in series with the first capacitor. In other words, double layer capacitors store their energy in the electric field of the electrochemical double layers of the two electrodes.

As in aluminum electrolytic capacitors, DLCs use organic solvents as the electrolytic fluid. The useful temperature range of conventional double layer capacitors is narrower than that of aluminum electrolytic capacitors, about $-25$ to $70°$ C. rather than $-55$ to $125°$ C. However, they have a much greater capacity per unit volume: 1 compared with only 0.001.

Double layer capacitors also have higher capacitance than aluminum electrolytic capacitors, typically exhibiting a capacitance of $10^{-2}$ to $10^2$ Farads, relative to $10^{-6}$ to $10^{-2}$ Farads. In comparison, primary and secondary batteries have a typical capacitance of $10^2$ to $10^6$ Farads. However, double layer capacitors have significant advantages over Ni—Cd and lead sealed batteries. For example, double layer capacitors do not pollute the environment and can perform significantly more charge/discharge cycles (more than 100,000 cycles compared with 500 cycles for a typical Ni—Cd battery and 200-1000 cycles for a lead sealed battery).

DLCs are used in consumer products, such as for appliance power backup and volatile memory power, in computer electronics in memory power sources and decoupling energy sources, and in industrial and automotive electronics. The ability to produce improved DLCs which are safer and more efficient is thus very desirable.

SUMMARY OF THE INVENTION

A double layer capacitor according to the invention comprises at least one double layer capacitor cell, wherein each double layer capacitor cell comprises a first and a second current collector each current collector comprising a metallized carrier film having an upper planar surface and a lower planar surface, a first thin electrode layer in direct contact with the lower planar surface of the metallized carrier film of the first current collector, a second thin electrode layer in direct contact with the upper planar surface of the metallized carrier film of the second current collector, and a thin polymer electrolyte layer in direct contact with the first and the second thin electrode layers, wherein the polymer electrolyte is applied as a liquid which impregnates and encases the first and the second electrode layers and is then solidified to form the electrolyte layer This invention also relates to a method of producing a double layer capacitor comprising at least two double layer capacitor cells, the method comprising:

(a) providing a polymer film having a first and a second planar surface;

(b) metallizing each of the first and the second planar surfaces with a layer of metal to produce a current collector having an upper and a lower planar surface;

(c) applying a thin layer of an electrode to each of the first and second planar surfaces of the current collector;

(d) applying a thin layer of a polymer electrolyte to each of the planar surfaces of the current collector and the electrode layer to produce a composite structure, wherein the electrode layers are impregnated with and encased by the polymer electrolyte;

(e) stacking at least two composite structures in an off-set configuration to produce a double layer capacitor, wherein the double layer capacitor has an upper planar surface, a lower planar surface, and a perpendicular edge;

(f) applying a metal end spray termination to the perpendicular edge of the double layer capacitor; and (g) thermally treating the double layer capacitor to stiffen the polymer films.

A method for forming a cross-linked electrolyte comprises preparing a solution comprising a cross-linkable silane having formula I or II, a lithium salt, a cross-linking agent, at least one photoinitiator, and an oxygen scavenger, applying the solution to a substrate, and applying at least one selected from the group consisting of UV irradiation, heat, and e-beam to cross-link the silane;

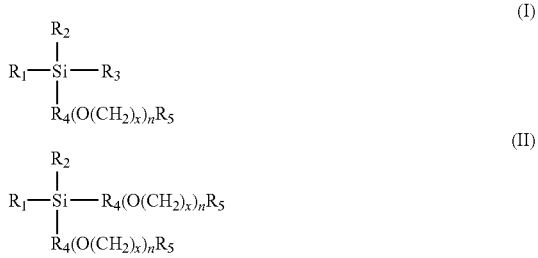

wherein $R_1$, $R_2$, and $R_3$ may be the same or different and may be linear or branched alkyl or alkyloxy groups having about 1 to about 6 carbon atoms; $R_4$ may be an alkyl group having about 1 to about 6 carbon atoms or an alkyleneoxygroup having about 3 to about 12 carbon atoms, x may be 2 or 3, n may be about 3 to 12, and $R_5$ may be an alkyl or alkoxy group having about 1 or 2 carbon atoms or a methacryloxy group.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings:

FIG. 2A is a schematic of a double layer capacitor according to one aspect of the invention;

FIG. 2B is a schematic of a composite for use in a double layer capacitor according to one aspect of the invention;

FIG. 3 is a schematic of a double layer capacitor according to another aspect of the invention;

DETAILED DESCRIPTION OF THE INVENTION

Figures 1, 1A:
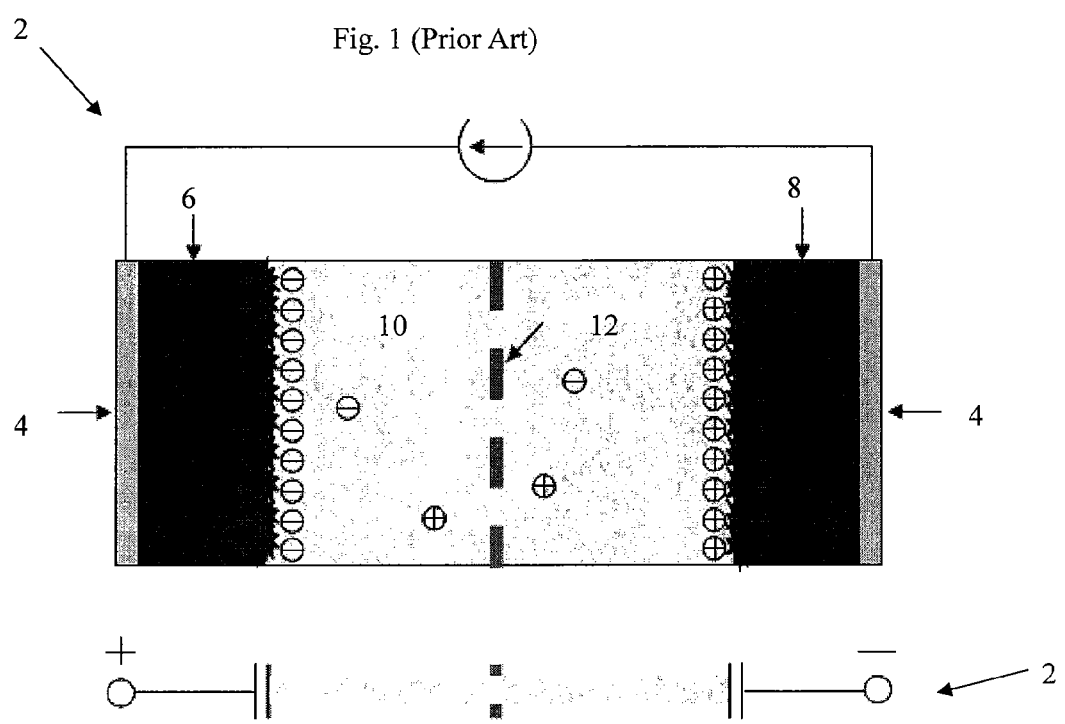
FIGS. 1 and 1A are a top view and a side view schematic of a simple prior art double layer capacitor.

The present invention is directed to stacked double layer capacitors which have many advantages over traditional DLCs. For example, the inventive capacitors are compact and lightweight, self-enclosed (thus requiring no heavy metal housings), modular, and may be produced in a variety of designs and sizes. The DLCs in accordance with the present invention have a cycle life of several hundred thousand cycles, exhibit excellent reliability, and are flame retardant. Such capacitors exhibit no vapor pressure buildup, are inherently safe (will not leak or evolve toxic fumes), and exhibit less capacitance drop off and higher operating temperatures than known capacitors (125° C. v. 70° C.). Since the inventive DLCs are very thin, they have a much higher energy density than conventional DLCs, allowing for more power per equivalent volume and significantly improved electrical performance. Finally, the capacitors according to the invention also exhibit a lower ESR (Equivalent Series Resistance), a measure of how a capacitor will perform in an application than traditional DLCs.

As explained in more detail below, the DLCs according to the invention utilize low-cost, lightweight, ultra-thin double metallized carrier films as current collectors rather than conventional solid metal (foil) current collectors. Further, in preferred embodiments, solid polymer electrolytes are used to replace traditional volatile (and typically corrosive) organic solvents (liquid electrolytes), and forms of activated carbon (ultra-thin layers of carbon on plastic) are used as high efficiency electrodes rather than thick carbon-coated foils or fibers.

A DLC 14 according to one preferred embodiment of the invention is shown in FIG. 2A. The capacitor 14 contains current collectors or plates 24, which comprise unique dual-sided metallized carrier films (as better shown in FIG. 3), and composite electrode/electrolyte/electrode structures (16 in FIG. 2B) containing cathodes 18, solid polymer electrolyte layers 20, and anodes 22. The current collectors 24 "sandwich" the composite structures 16 to form a stacked or layered construction. Another embodiment of the invention is shown in FIG. 3. This version of a double layer capacitor 28 comprises the same dual-sided metallized carrier film containing polymer carrier 30 with metallization 32 on both sides, but in this instance both the electrodes 34, 36 and the electrolyte 38 are "sandwiched" to the carrier film 30. Each of these components will be described in more detail below.

A single DLC cell may be considered to contain two current collectors, two layers of electrodes, and "one" intertwined layer of electrolyte which is sandwiched between and in direct (intimate) contact with the two electrode layers. To increase capacitance, single cells are paralleled with one another via either a stacked or concentrically wound process in a collector-electrode-electrolyte-electrode-collector stacking scheme. The maximum number of single cells which may be stacked is limited only by the height-width ratio necessary for maintaining physical stability.

The alternating layers of the capacitor stack are off-set or shifted relative to one another to create an equal extension of carrier film out the opposite ends that can be contacted by a common material, such as a metal spray. Such a metal end spray can physically bond to the extended layers and produce a termination.

The DLC 14 is preferably terminated by a thermal spray of metal 26 which contacts the entire edge of the metallized current collectors 24, as shown in FIG. 2A, and enables the connection of the capacitor's current collector plates to a singular outside termination. It is within the scope of the invention to utilize a variety of metals for the termination, such as aluminum, copper, tin, and zinc. Preferably the termination contains only one metal. The metal 26 may be applied by, for example, gas flame or electric arc atomizing of the metal which is then deposited via an air stream onto the capacitor electrodes 24. The dimensions of the metal spray 26 thickness are not critical as long as the metal end spray putdown is sufficient to provide physical stability to the capacitor 14 and to the attached outside termination, typically a lead wire or lead frame (not shown).

The termination according to the invention is different than that which is used in conventional DLCs, which utilize a metal tab interface that makes only intermittent contact with the edges of the current collectors. The metal thermal spray termination in the DLCs 14 according to the invention facilitates the connection of the DLC's current collector plates 24 to a singular outside termination. Compared to the conventional use of foil current collector plates and tabs, the inventive construction greatly reduces the series resistance of the current path by allowing the entire end width of the collector plates 24 to conduct current into and out of the capacitor 14, rather than funneling the current through a few narrow tabs. This greatly reduces the ESR of the capacitor and, since power density is primarily determined by ESR, the power density of the resulting DLC 14 is increased. Additionally, the use of only one type of metal in the termination in a preferred embodiment is advantageous because it eliminates the possibility of corrosion due to the galvanic effects of dissimilar metals in the presence of an ion-conducting medium, such as may occur with known zinc/babbit spray terminations.

Metallized Carrier Film (Current Collector)

Figure 4:
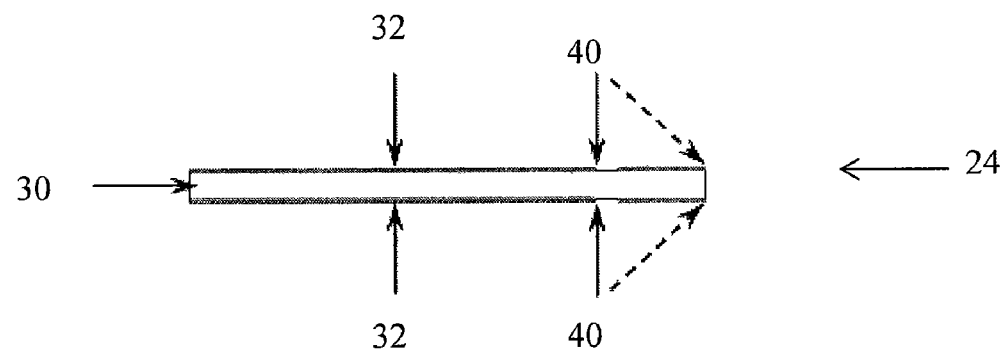
FIG. 4 is a schematic of a dual-sided metallized carrier film current collector.

The current collector 24 for use in one preferred embodiment of the inventive DLC is a metallized carrier film, preferably a dual-sided metallized carrier film 30, as shown in FIG. 4. Preferably, the current collector 24 consists essentially of a metallized carrier film 30, that is, it does not contain any organic, inorganic, or other material impregnated or contained therein. The carrier film 30 is preferably a polymer film. Any polymer film that can be metallized and has sufficient thermal withstanding (ability to withstand operating temperatures of greater than 70° C., preferably greater than 125° C.) may be used in the metallized current collector. Preferred polymer films include, without limitation, PET (polyethylene terephthalate), PEN (polyethylene naphthalate) and PPS (poly(p-phenylene sulfide)).

The carrier film 30 is coated on one or preferably both sides with a metal 32 (metallized). Methods for applying metals to carrier films are well known in the art and need not be described. A variety of metals may be used for metallization 32. Specifically, any metal that may be vapor deposited on a polymer film substrate would be appropriate, including without limitation copper, silver, zinc, various alloys, and aluminum. Aluminum is presently preferred for metallization because it makes the current collector 24 chemically akin to those currently used and is also the preferred material currently utilized in the manufacture of metallized films for film capacitor use.

Preferably, the current collectors 24 contain an isolation path 40 in the metallization in order to allow for electrical isolation between adjacent layers when adjacent layers are stacked together for physical unification. A simple non-metallized safety margin extends optionally to the edge of the capacitor, for example, or an isolation path (safety lane) may be located within the capacitor.

By including an electrically isolated area on the layer that is in-set, any over spray from the metal end spray 26 operation will not short out that layer to the layers above and below it. In addition, the isolated area allows for physical contact between adjacent stacked layers without electrically joining the areas. Most preferably, the entire margin area is clear of metallization, but it is also within the scope of the invention to simply form a narrow isolation path, which would have a similar effect.

Each current collector 24 is preferably about 0.5 to about 10 microns thick. Polymer films with thicknesses as low as 0.5 microns are available and may be covered with two metallization layers 32 having preferred thicknesses of about 0.001 to 1.00 microns, preferably about 0.06 microns. In conventional DLCs, the aluminum foil layer serving as a current collector is 25-30 microns thick, and thus the inventive capacitors represent a significant thickness reduction.

Figure 5:
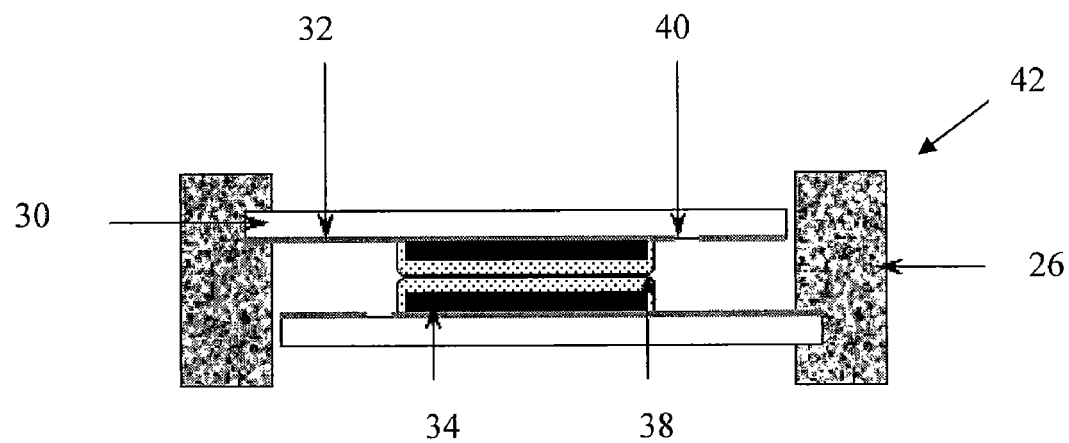
FIG. 5 is a schematic of a single cell double layer capacitor.

As noted above, it is preferred that the carrier film 30 is dual-sided and contains metal coatings 32 on both sides of the film 30. Such a design allows for efficient stacking of adjacent capacitor cells. However, as shown in FIG. 5, it is also within the scope of the invention to utilize single-sided metallized carrier films 30 as current collectors 24, such as when only a single cell capacitor 42 is desired for a particular application.

Electrodes

The electrodes for use in the DLCs according to the invention may be produced from a variety of materials, including without limitation ruthenium, molybdenum, titanium, iron, nickel, and barium-titanate. The preferred material is carbon due to its high surface area (greater than 2000 $m^2/g$), availability, chemical stability, relatively low cost, and ease of use. Many different carbon structures may be used as an electrode, including nano-tube filaments, nano-carbon onions, and mesoporous carbon. These structures differ mainly in their effective surface area, which in turn determines the maximum possible amount of capacitance.

The most presently preferred electrode material is a graphite-based material, also known as a carbon ink. The preferred graphite-based material comprises nanocarbon graphite fibers (fibrils) which are dispersed in a binder, a resin solution containing a resin and an appropriate solvent which is determined by the particular resin which is included. In a preferred embodiment, the graphite fibrils are about 90 to about 200 nm in diameter and are of varying lengths ranging from less than about 1 micron to about 5 microns, such as are commercially available from Catalytic Materials LLC (Peterboro, N.C.). Such fibrils are flattened multi-wall nanotube carbon which is formed into strands or fibers having very high internal surface areas. The carbon fibers are long enough to extend from the top to the bottom of the carbon electrode layer 34, 36, provide high conductivity, and maintain a lower resistance than that which may be achieved with multiple pieces of carbon. In a preferred embodiment, the fibrils are thermo-expanded (exfoliated) graphite to facilitate lithium ion intercalation.

The binder in the electrode material provides adhesion of the carbon to the current collectors and is also a carrier for the carbon. A compatible binder (resin solution containing resin, solvent, and optionally other components, as described in more detail below), is needed to ensure that the graphite particles remain separated from one another. Preferably, the weight ratio of graphite to resin in the carbon ink (electrode material) is about 7:1 to about 1:1, more preferably about 5:1 to about 1:1. A preferred carbon ink has a final solids (carbon and resin) weight concentration of about 5 to about 20%, such as an ink containing about 80 weight % solvent, about 10 weight % resin, and about 10 weight % carbon, or an ink containing about 90 weight % solvent, about 2-5 weight % resin, and about 2-5 weight % carbon.

Exemplary resins include polyethylene/vinyl acetate copolymers (such as those which are commercially available from DuPont as Elvax® series resins), polyethylene/vinyl acetate/acid terpolymers (such as those which are commercially available from DuPont as Elvax® 4260, 4321, 4310, or 4355), polyamide, polyurethane, and nitrocellulose. Appropriate solvents include, without limitation, aromatic hydrocarbons, such as toluene and xylene, acetates, ketones, dimethyl formamide, dimethyl acetamide, and mixtures thereof.

It is also within the scope of the invention to utilize a polyvinylidene fluoride (PVDF) resin, such as Kynar® 2801, Kynar® 9301, or Kynar® 9000. Appropriate solvents for this type of resin include N-methylpyrrolidinone (NMP), methylethylketone, acetone, cyclohexanone, and mixtures thereof.

It is also within the scope of the invention to include additional optional additives or components in the electrode material, such as the preferred carbon ink electrode material. For example, it may be desirable to include a surfactant as a wetting agent to lower surface tension, allowing for easier ink flow and spreading. For example, a surfactant such as BYK 163, commercially available from BYK Chemie, may be included. This silicone surface additive, more specifically, a polyether modified polydimethylsiloxane, stabilizes the graphite in the resin solution and improves flow and leveling.

The preferred carbon-based material which is used as an electrode in the double layer capacitor according to the present invention has several desirable properties. For example, the components thereof (such as solvent, graphite, binder, and other fugitive or inert components) should ideally be selected to produce the rheology needed for an acceptable ink, and the material should be capable of being applied to a thickness of about 1 to 10 microns, more preferably about 2 to 5 microns, should maintain a printed resolution of less than about 0.005" (about 0.01 cm), and should have excellent edge retention (resolution) with minimal bleeding. Preferably, the ink should be resistant to solvating in the electrolyte, yet remain open to electrolyte penetration, should be capable of operating at 125° C., and should provide a sheet resistivity of less than 0.5 Ω/square. Finally, the preferred electrode material should be capable of passing the #810 "scotch tape" test similar to ASTM D3359 for adhesion. Such a test assesses adhesion, the ability of a coating to resist "reasonable" (based on the treatment the finished product will receive in the hands of the end user) attempts to remove it from the material to which it is applied.

The electrode material may be prepared by any method known in the art or to be developed. In one preferred embodiment, the electrode is prepared by first dissolving the resin in the solvent, then slowly adding the graphite with mixing to disperse the graphite in the resin solution. The particle sizes of the agglomerated fibrils are then reduced by grinding in a shaker mill containing steel media until most of the particles have a length of less than 5 microns, typically requiring about 15-30 minutes at a frequency of 5 Hz. Other methods of grinding, such as ball mill and sonification, would also be appropriate. The final viscosity of the resulting ink may then be adjusted, such as to the preferred viscosity of about 50 to about 100 cps, by adding additional solvent as needed.

The ink may be applied to the metallized polymer current collector by any method known in the art or to be developed, such as by the preferred gravure printing process, and then dried, such as by using forced hot air at a temperature of about 140° F. to about 210° F. (about 60° C. to about 100° C.). Gravure printing is preferred because it provides thin film control and sharp edges. However, other appropriate printing processes include, for example, flexography, lithography, silk screening, ink jet technology, and spray technology. The resulting electrode film preferably has a thickness of about 1 to 10 microns, more preferably about 2 to 5 microns.

Figure 6:
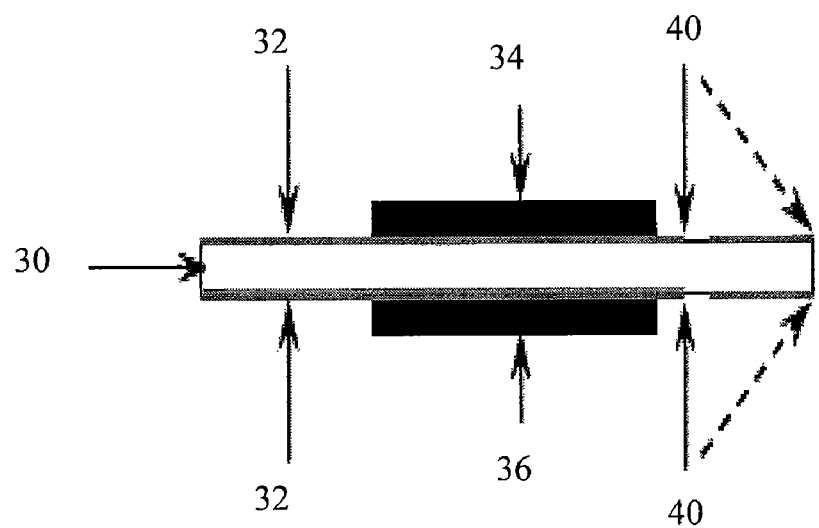
FIG. 6 is a schematic of a current collector according to the invention with an attached electrode.

As shown in FIG. 6, two carbon electrodes 34, 36 may be intimately attached to (in direct contact with) both sides of a dual-sided metallized carrier film 30 to form a composite "sandwich." That is, the dual-sided metallized carrier film 30 has an upper planar surface and a lower planar surface. One thin electrode layer 36 is in direct contact with the lower planar surface and a second thin electrode layer 34 is in direct contact with the upper planar surface to form a sandwich structure. The carrier/electrode composite enables volume manufacturing in an automated environment as well as a more stable interface between the carbon electrodes 34, 36 and metal current collector 24, resulting in reduced ESR and improved capacitance stability.

As described above, the carbon electrodes 34, 36 may be applied to the carrier film support medium 30 (functioning as an electrically conducting surface) by a number of methods known in the art, such as spray, paint, blade, printing, gravure, or screen printing using thermal, electrical, or solvent transfer media. Depending on the particular application, the carbon electrodes 34, 36 may be applied to thicknesses of about 1 micron to about 10 microns, more preferably about 2 to about 5 microns. In contrast, prior art DLCs utilize carbon in the form of a powder, cloth, nanotube, fiber, foam, gel, etc., and typically contain electrode layers which are about 150 microns thick. The ability to utilize very thin layers of carbon which are intimately attached to the current collectors, rather than being discrete entities, enables a dramatic reduction in thickness of the electrode component of the DLC.

Electrolyte

In a preferred embodiment, the electrolyte 38 for use in the double layer capacitor is a solid electrolyte which enables use at high temperature with no unfavorable vapor pressure. Preferred electrolytes are highly ionically conductive, cross-linkable, and have the ability to be cured rapidly. One potential electrolyte 38 is a highly conductive, cross-linkable silane, such as a silane material containing polyalkyleneoxide (such as polyethyleneoxide) side chains, which provide the polymer electrolyte with enhanced conductivity and improved safety features. Such a material combines the advantages of using a safe, stable and structurally flexible silane material with the lithium salt-solvating ability of a polyalkyleneoxide-containing compound. Following cross-linking, the polyethyleneoxide silane material becomes a highly branched polymer.

In a preferred embodiment, the electrolyte 38 additionally comprises a lithium salt, a cross-linking agent, at least one photoinitiator, an oxygen scavenger, and optionally a cross-linking control agent. These components are described in more detail below. Lithium ion transport in the polyalkyleneoxidesilane depends on the complexation of lithium ions by the oxygen atoms in oxyethylene units in the polymer chains. The polyalkyleneoxide silane is stable up to 5.1 V with a conductivity on the order of $4 \times 10^{-4}$ S/cm and it has been found that cross-linking has minimal effect on the conductivity.

A potential silane compound (which will be cross-linked to produce a highly branched polymer) has at least one polyalkyleneoxide group as a side chain directly bonded to the silicon atom, such as compounds having the general structure I:

$R_1$, $R_2$, and $R_3$, representing the substituents on the silicon, may be the same or different and may be linear or branched alkyl or alkyloxy groups having about 1 to about 6 carbon atoms. $R_4$, representing a spacer group, may be an alkyl group having about 1 to about 6 carbon atoms or an alkyleneoxy-group having about 3 to about 12 carbon atoms. When $R_4$ is an alkyleneoxy group, the silane may be seen as having no spacer group. "x" may be 2 (ethyleneoxy groups) or 3 (propyleneoxy groups), and n, representing the number of alkyleneoxy groups, may be about 3 to 12. Finally, $R_5$, representing the terminal group on the alkyleneoxy chain, may be an alkyl or alkoxy group having about 1 or 2 carbon atoms or a methacryloxy [$CH_2$=C($CH_3$)COO—] group.

For example, one potential silane compound for us in the electrolyte according to the invention contains three methoxy substituents on the silicon ($R_1=R_2=R_3$=$OCH_3$), a propyl spacer group ($R_4$=propyl), x=2 (ethyleneoxy), n=6-9, and $R_5$=methoxy. A second preferred silane contains three methyl substituents on the silicon ($R_1=R_2=R_3=CH_3$), x=2 (ethyleneoxy), n=2-5, $R_4$=ethyleneoxy, $R_5$=methacryloxy.

A second potential silane material contains two alkyleneoxy-containing side chains and has the general structure II:

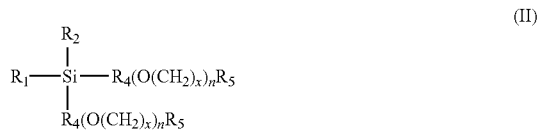

(II)

As defined above, $R_1$ and $R_2$, representing the substituents on the silicon, may be the same or different and may be linear or branched alkyl or alkyloxy groups having about 1 to about 6 carbon atoms. $R_4$, representing a spacer group, may be an alkyl group having about 1 to about 6 carbon atoms or an alkyleneoxygroup having about 3 to about 12 carbon atoms. When $R_4$ is an alkyleneoxy group, the silane may be seen as having no spacer group. "x" may be 2 (ethylenoxy groups) or 3 (propyleneoxy groups), and n, representing the number of alkyleneoxy groups, may be about 3 to 12. Finally, $R_5$, representing the terminal group on the alkyleneoxy chain, may be an alkyl or alkoxy group having about 1 or 2 carbon atoms or a methacryloxy group.

As previously described, in a preferred embodiment, the electrolyte additionally comprises, in addition to the cross-linkable compound, a lithium salt, a cross-linking agent, at least one photoinitiator, an oxygen scavenger, and optionally a cross-linking control agent. Each of these preferred components is well known in the art. Upon cross-linking as described below, the silane material or other cross-linkable compound is complexed into a polymer matrix formed by the acrylates and diacrylates.

A particularly attractive lithium salt is lithium bis-oxaloto borate, $Li[B(C_2O_4)_2]$, "Libob", but other lithium salts, such as $LiPF_6$, $LiBF_4$, etc., may also be used. The lithium intercalates into the carbon plates of the electrode. Libob is preferred because the conductivity thereof increases with temperature, which is desirable. In one embodiment, the electrolyte composition may contain about 5-10% by weight of the lithium salt, such as about 6 to about 8 weight %.

Appropriate photoinitiators are well known in the art and include, for example, phenyl butanone-type and phenyl phosphine oxide-type photoinitiators. Specific examples of appropriate photoinitiators include, without limitation, Irgacure 2022, Irgacure 184, Irgacure 784, Irgacure 754, Darocure 1173, Irgacure 379 and Irgacure 819, all commercially available from CIBA Specialty Chemicals. One or more photoinitiators may be included in the electrolyte composition. The total weight of photoinitiator(s) may be about 1 to about 10% by weight, such as about 5%.

An exemplary oxygen scavenger is Sartomer CN 373, a reactive amine coinitiator which is commercially available from Sartomer Company, Inc., Exton, Pa. However, other oxygen scavengers which are known in the art or to be developed would also be appropriate. The oxygen scavenger may be included in an amount of about 1 to about 4 weight %, such as about 3 weight %.

The cross-linking agent may be a diacrylate-terminated polyalkylether with ethylene and/or propylene oxide units in the backbone, such as those having structure III:

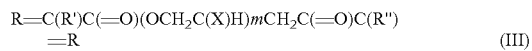

(III)

R is an alkyl group having about 1 to about 10 carbon atoms, R' and R'' may be the same or different and may be H, an alkyl group having about 1 to 10 carbon atoms, or an alkenyl group having about 2 to 12 carbon atoms, X may be H or a methyl group, and m is about 1 to 15. For example, an exemplary cross-linking agent is Sartomer SR344, a polyethyleneoxide diacrylate with a molecular weight of 508, commercially available from Sartomer Company, Inc. The cross-linking agent may be included in the electrolyte composition in an amount of about 30 to 40 weight %, such as about 31 to about 33 weight %.

Finally, if included, the cross-linking control agent for controlling cross-linking density may be a monofunctional acrylate polyalkylether monomer having ethylene and/or propylene oxide units in the backbone, such as an acrylate with the general structure IV:

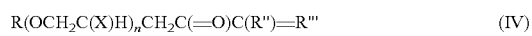

(IV)

wherein R and R''' may be the same or different and may be alkyl groups having 1 to 10 carbon atoms, R'' may be H, an alkyl group having 1 to 10 carbon atoms, or an alkenyl group having 2 to 12 carbon atoms, X may be H or a methyl group, and n is about 1 to 20.

As noted above, one exemplary silane has an acrylate functional group, such as o-methacryloxy (polyethylene-oxy)trimethoxysilane (containing 4-6 ethylene oxide groups), which is commercially available from Gelest, Inc. (Morrisville, Pa.). If this silane is included, it may not be necessary to additionally include a cross-linking control agent in the electrolyte because the acrylate functional group on the silane may serve the same role.

In one exemplary formulation, the electrolyte contains about 50-60% by weight cross-linkable compound, such as a polyethyleneoxide silane, about 5-10% lithium salt, about 2-10% photoinitiator(s), about 0-35% cross-linking agent, about 0-25% cross-linking control agent, and about 1-4% oxygen scavenger, all percentages being by weight based on the total weight of the electrolyte. If a cross-linking control agent is not included, the composition may contain about 10 to about 40% reactive compounds (total of cross-linking agent and oxygen scavenger). Additional additives may optionally be included in the electrolyte composition, such as thickeners, leveling agents, and inhibitors. Such additives are well known in the art and need not be described. An exemplary electrolyte composition is shown in the following Table 1. An electrolyte may be prepared by known methods, such as by simply combining and mixing the desired components in the order listed below.

TABLE 1

Exemplary Electrolyte

| Compound | Potential Range (weight %) |
|---|---|
| cross-linkable compound | 50-60 |
| Lithium salt | 5-10 |

TABLE 1-continued

Exemplary Electrolyte

| Compound | Potential Range (weight %) |
|---|---|
| Cross-linking agent | 30-40 |
| Photoinitiators | 2-10 |
| Oxygen scavenger | 1-4 |

Regardless of the exact components which are included in the electrolyte, it preferably has certain desirable characteristics. For example, the components thereof (such as a silane, lithium salt, cross-linking agent, photoinitiator(s), and other inert or fugitive additives) should be selected to produce the rheology needed for an acceptable ink and the material should be capable of being applied to a 2-5 micron thickness. It should be able to maintain a printed resolution of less than about 0.005" (about 0.01 cm), exhibit excellent edge retention (resolution) with minimal bleeding, be capable of operating at 125° C., exhibit a conductivity of approximately $4.0 \times 10^{-4}$ S/cm, have a low viscosity to properly penetrate carbon, and be capable of passing a Scotch tape or similar test for adhesion. Finally, the coating should be sufficiently thick to provide an electrically insulating barrier on its surface.

Although it is preferred to utilize a solid electrolyte 38 in the inventive DLC, it is also within the scope of the invention to utilize aqueous electrolytes, such as potassium hydroxide and sulfuric acid, and other organic electrolytes, such as propylene carbonate. Other electrolytes may also be contemplated and the specific electrolytes listed are intended to be exemplary, not limiting.

The electrolyte 38 is preferably printed on the metallized film (current carrier) or onto graphite-containing ink which has been previously printed on the metallized film. The preferred method of electrolyte printing is via the gravure printing process, but it is also within the scope of the invention to utilize other known or to be developed printing methods, including flexography, silk screening, and lithography. The resulting electrolyte film thickness is preferably about 1 to about 10 microns, more preferably about 2 to about 5 microns, most preferably about 4 microns.

The printed electrolyte is then cross-linked (cured). A preferred curing method utilizes ultraviolet (UV) radiation ranging from 200 to 425 nm; the amount of energy which is delivered depends on several factors, including dwell time under the UV lamp, specific photoinitiator, lamp, and coating thickness, and an appropriate amount of energy may be determined by routine experimentation. Another preferred method of curing is a combination of heat and UV, such as heating at about 80° C. for about 0.5 to 4 minutes, followed by UV irradiation. The photoinitiator(s) in the electrolyte absorb the UV irradiation and form free radicals, which in turn initiate the polymerization of unsaturated acrylate monomers and multifunctional acrylated oligomers. In contrast with prior art electrolytes which require curing in an inert atmosphere at elevated temperature for prolonged time periods of at least one hour, the electrolyte according to the invention may be cured in a very short time (less than five minutes) in air, a much more rapid cure and under simpler curing conditions.

It is also within the scope of the invention to cure the electrolyte using electron-beam methods. E-beam works by accelerating electrons to extremely high speeds and then targeting these accelerated electrons to penetrate the target substance. The electrons cause molecular changes in the product and are thus effective for strengthening polymers; curing inks, coatings and adhesives; increasing scratch, scuff, and abrasion resistance; increasing chemical resistance, etc. In this case, the beam of electrons reacts with the double bonds in the acrylate, allowing them to cross-link. If such methods are employed, it may not be necessary to include a photoinitiator in the electrolyte composition, since such an initiator will not be needed to initiate polymerization. This may be desirable because such compounds may possibly inhibit the flow of electrons through the electrolyte and thus affect capacitance and conductivity.

Figure 7:
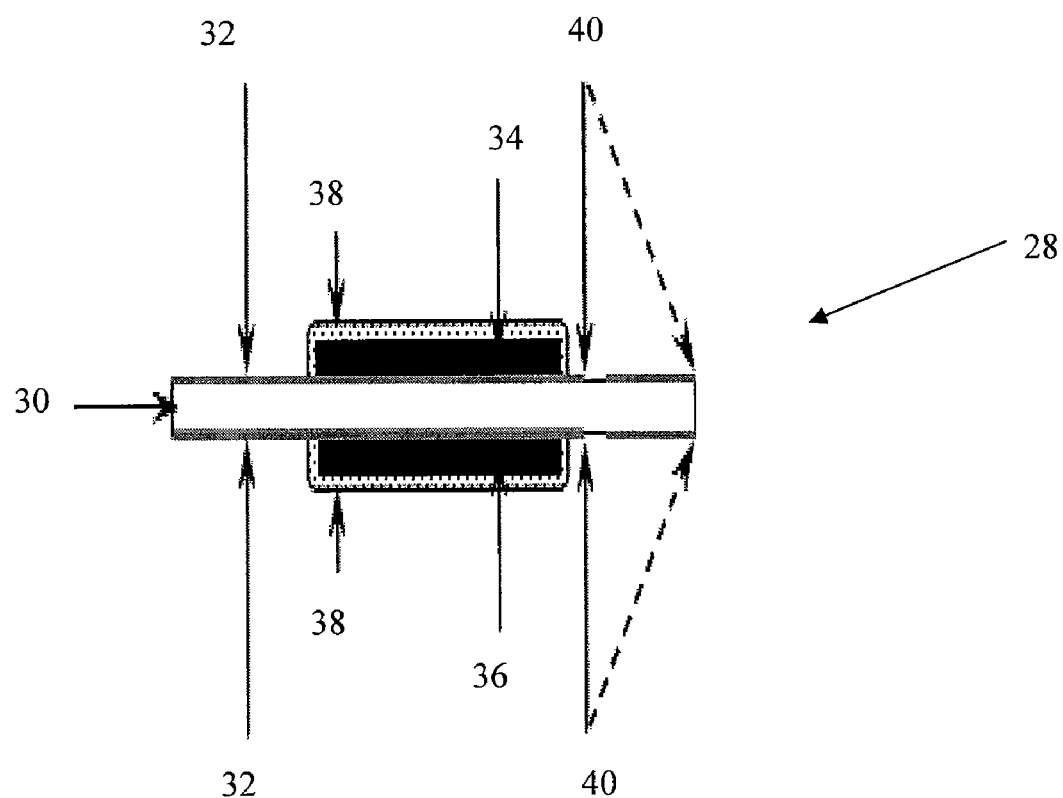
FIG. 7 is a schematic of a current collector and electrode according to the invention with an attached solid electrolyte.

In one embodiment, the electrolyte material may be impregnated into the capacitor structure in liquid form and used as-is. Preferably, the electrolyte 38 is impregnated and absorbed into the electrodes 34, 36 and onto the top surface, sandwiching the electrodes between the current collector 24 and the outer surface of the electrolyte 38. The electrolyte thus interfaces with the layers of carbon. More preferably, the electrolyte is cross-linked into a solid. It is also within the scope of the invention to cross-link the electrolyte to an intermediate or gel state. The resulting electrolyte 38/carbon electrode 34/carrier film 30/carbon electrode 36/electrolyte 38 composite film, shown in FIG. 7, may then be stacked to form a multiplicity of capacitor layers. This novel approach of cross-linking the electrolyte 38 into and above the surface of the carbon electrodes 34, 36 provides complete coverage of carbon electrodes 34, 36 by the solid electrolyte 38 and eliminates the need to use an inserted separator between the carbon electrode layers in the double layer capacitor 14. Further, application of the electrolyte 38 to the electrodes 34, 36 in liquid form and then cross-linking in situ allows for impregnation of the electrolyte into the electrodes and encasement of the electrode with the electrolyte, rather than just forming a film of electrolyte 38 on the surface of the electrodes 34, 36, which would result from using a pre-formed solid electrolyte film.

Solid electrolytes are advantageous over conventional volatile liquid electrolytes, which are prone to leaking, can dry out, and require venting due to vapor pressure build-up. The inventive capacitors will thus have no potential problems with leakage or shortened life, and are safer than conventional DLCs. When such solid electrolytes are included, the capacitor can be used at operating temperatures in excess of 125° C. In contrast, current DLCs are limited to 70° C., with a few able to operate at 85° C.

Figure 8:
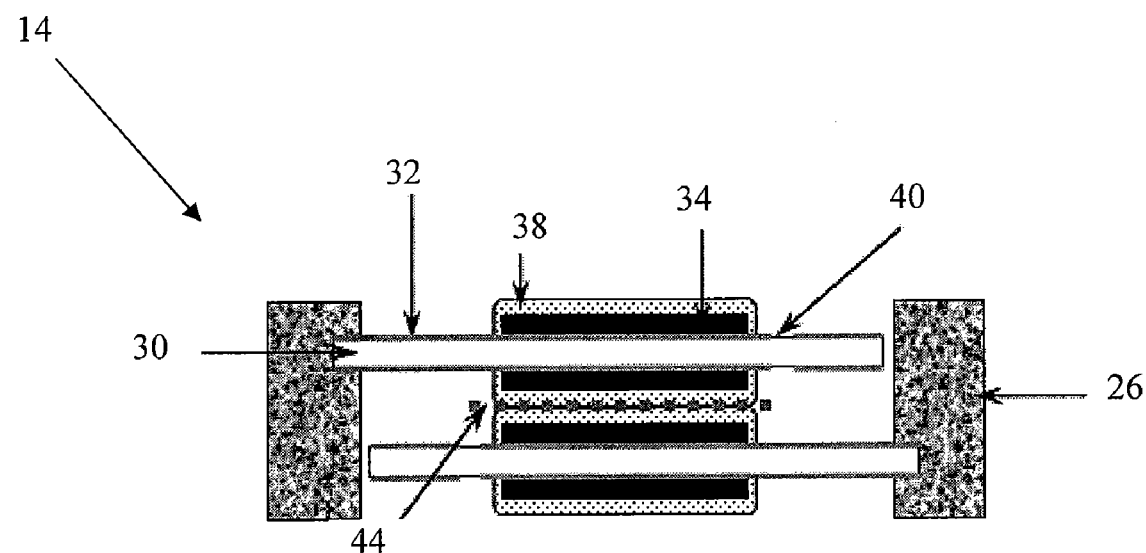
FIG. 8 is a schematic of a double layer capacitor according to a further aspect of the invention.

If the electrolyte is maintained in a liquid state, the DLC preferably further comprises a separator layer 44 at the carbon electrode interface which comprises paper or a porous polymer, as shown in FIG. 8. Such a separator 44 functions to electrically insulate the carbon electrode from the adjacent layer of stacked carbon electrodes and also to contain the electrolyte 38 and allow for ionic flow between adjacent layers of carbon electrodes. A separator 44 is not needed when the electrolyte 38 is impregnated into the electrode and cross-linked. Rather, to the extent that the electrolyte 38 covers the top surface of the electrode and has been cross-linked into a solid, it electrically insulates the electrodes from the adjacent electrodes, thereby replacing the function served by a separator. If desired, however, a separator may still be included when the electrolyte is in the solid state.

Double Layer Capacitor Structure

As previously explained, the DLCs according to the invention are produced from thin layers of materials (current collectors 24, carbon electrode layers 34, 36, and solid electrolyte layers 38) and are thus extremely thin structures. The double layer capacitors according to the invention preferably exhibit a capacitance of about 1.0 microfarad/cm$^2$ to about 1.0 farad/cm$^2$, more preferably about 100 milifarad/cm$^2$. The current collectors 24 are preferably not thicker than about 6 microns each and are formed of thin metallized polymer films 30 rather than thick foils, as in prior art DLCs. Whereas foils require multiple tabs to be inserted to provide a current path from the current collector to external leads, metallized films may utilize metal end spray 26, described previously, which provides virtually 100% connection of the collector to external leads, thus reducing both ESR and impedance of capacitance.

The inventive carbon electrodes 34, 36 may be as thin as 1 micron each and are preferably no thicker than about 10 microns, providing the ability to stack multiple layers in parallel to produce the same total capacitance as traditional thicker electrodes.

The electrolyte 38, acting as both an ionic transport medium and as a separator, may be no thicker than about 10 microns, preferably about 2 to about 5 microns, greatly reducing the ESR by shortening the ion flow path.

In a stacked structure containing two current collectors 24, two electrode layers 34, 36, and one electrolyte 38, the resulting DLC may have an overall thickness of as low as about 5 microns, preferably no more than about 60 microns, more preferably no more than about 20 microns. In contrast, typical DLCs have an overall thickness of about 390 microns, due mainly to thicker carbon electrodes (150 microns) and current collectors (30 microns). Due to significant reduction in each of the material layer thickness, the finished cell thickness of the inventive DLC allows a multiplicity of cells to be stacked to increase capacitance, increase energy storage, and significantly reduce ESR. These reductions in material thicknesses will produce a nearly ten-fold size reduction in the finished capacitor while at the same time greatly enhancing performance. The preferred solid electrolyte is highly stable, non-outgassing, flame resistant, and monolithic.

Additionally, the unique thin electrolyte/carbon/polymer/carbon/electrolyte composite construction provides ease of manufacture and volume manufacturing in an automated environment, such as the Interleaf® Technology described below, compared with standard methods of hand assembly or single winding. More specifically, the construction of conventional DLCs requires maintaining the registration on 4-6 discrete web layers, with varying degrees of tension control required for the different materials comprising each of the webs. In contrast, the DLCs according to the invention may be prepared from only two web layers with identical tension control requirements. Furthermore, while conventional DLC construction requires either special machinery or hand assembly, the novel capacitor structure according to the present invention is designed to work on standard capacitor winding equipment (such as wound, stacked, or Interleaf® Technology, allowing for the high volume/low-cost production of repeatable, high quality capacitors.

Method of Producing Double Layer Capacitors

The present invention also relates to a process for producing low-cost, high volume double layer capacitors. This method permits the winding of thousands of double layer capacitors simultaneously, compared with the currently known one-at-a-time systems involving hand assembly or simple winding. The method of the invention includes the following steps. It should be understood that the references to the components of the double layer capacitor, including, for example, the electrolyte, metals, polymer film, electrode, etc., are as previously described. Although it is within the scope of the invention to perform the method of producing a double layer capacitor on an individual sheet basis, it may be desirable to mass-produce DLCs and thus the materials must be put in a format that can be easily handled. Thus, the inventive method is preferably performed on a reel-to-reel basis, a known system of handling material webs that it highly cost effective and repeatable.

The first step in the method involves metallizing a polymer film 30 by applying a layer of metal 32 to one or preferably both planar surfaces of the polymer film 30 to produce a current collector 24, preferably containing non-metal margins 40. The margins are metal-clear areas or safety lanes, preferably narrow areas, which preferably run the length of the polymer film to electrically isolate one layer from an adjacent layer upon stacking, as described below. U.S. Pat. No. 4,533,813, which is herein incorporated by reference in its entirety, describes a method for applying isolation safety lanes to metallized current collectors.

The second step of the method comprises applying a thin layer of an electrode to one or both planar surfaces of the current collector. It is preferably performed using a gravure printing process from an electrode composition comprising an electrically active material, a binder, and a solvent, as previously described. This step may also be performed via other known methods, described previously, such as flexography, lithography, silk screening, ink jet technology, or spray technology. After printing, a drying or heating step is performed to remove the solvent. The electrode layer is preferably applied on a reel-to-reel basis. Essentially, the metallized film is unwound from a reel, fed through an appropriate electrode layer application system, such as a gravure printing press, for example, and then re-wound onto a second reel while constantly maintaining appropriate tension.

The third step of the method involves applying a thin layer of a polymer electrolyte 38 onto the surface of the current collector 24 and/or the electrode layers 34, 36 to produce a film layer of about 1 to 10 microns, preferably about 2 to 5 microns, more preferably about 4 microns thick. This application step is preferably applied by gravure printing, but may be performed by any known method, described previously. It is also preferably performed on a reel-to-reel basis.

This step also involves impregnating the carbon electrodes with the electrolyte 38 to the extent that at least the top surface of the electrodes 34, 36 is encased by the electrolyte 38. The top surface of the electrode must be protected from the corresponding top layer of the other electrode which will form a sandwich, as described previously. Capping of the electrodes 34, 36 with the preferably solid electrolyte is very important because it allows for the optional elimination of a separator layer (electrical insulator), allowing a size reduction as well as preventing electrical shorting while providing an ion conductive path.

If a solid electrolyte is desired, as in a preferred embodiment, this step may also involve cross-linking the polymer electrolyte, such as with UV, heat, and/or e-beam technology, as described previously, to form a solid electrolyte. The resulting structure, containing a metallized polymer film current collector 24, thin electrode layer 34, 36 and thin electrolyte layer 38 that caps the composite to electrically insulate the carbon layer, may be described as a "composite structure".

The next step in the present method involves stacking two layers of the composite structure in an off-set configuration, as shown in FIGS. 2 and 8, such as by using wound, stacked, Interleaf® Technology, or some other related form of film assembly technology to form a double layer capacitor. For example, U.S. Pat. No. 4,531,268, which is herein incorporated by reference in its entirety, describes various processes that may be used to produce a double layer capacitor structure. As previously explained, only two webs (here, layers of composite structure) are combined to produce the inventive DLC, in contrast with the 4-6 web layers required for the production of conventional DLCs.

It may be desirable at the time of winding, or in a separate pre- or post-winding step, to add a bead of liquid electrolyte to the top surface of the composite structure, on top of the cross-linked electrolyte. This liquid electrolyte would serve to fill in any gaps in the mating of the two composite films, when stacked, due to surface irregularities. The electrolyte may be left as a liquid which is held in place by capillary action or by the cohesive force of bonding similar materials, or may be cross-linked in a separate process in order to form a monolithic block of electrolyte connecting the two electrodes. Filling in any gaps will improve the ionic transport and reduce the ESR of the DLC cell.

The double layer capacitor has an upper and a lower planar surface and a perpendicular edge. Subsequently, a further step involves metal end spraying the perpendicular edge of the double layer capacitor to form a capacitor termination 26, followed by thermally treating the capacitor(s) to stiffen the polymer film in the current collectors. The appropriate time and temperature to be utilized for the thermal treatment may be determined on a case-by-case basis depending on the particular electrode and electrolyte which are include in the double layer capacitor. However, appropriate thermal treatment conditions may be heating at about 80° C. to about 250° C. for about 30 minutes to about 24 hours.

A final step in the method involves attaching leads to the capacitor blocks, resulting in the production of low cost, high volume double layer capacitors. As explained previously, it is preferred that all of the above steps be performed on a reel-to-reel basis, enabling the production of a large number of capacitors simultaneously.

Finally, the invention relates to a method for forming a cross-linked (polymerized) electrolyte. The method comprises preparing a solution comprising a cross-linkable silane having formula I or II, a lithium salt, a cross-linking agent, at least one photoinitiator, and an oxygen scavenger, applying the solution to a substrate, and applying at least one selected from the group consisting of UV irradiation, heat, and e-beam to cross-link the silane;

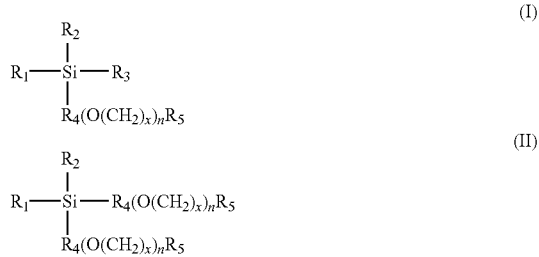

wherein $R_1$, $R_2$, and $R_3$ may be the same or different and may be linear or branched alkyl or alkyloxy groups having about 1 to about 6 carbon atoms; $R_4$ may be an alkyl group having about 1 to about 6 carbon atoms or an alkyleneoxy-group having about 3 to about 12 carbon atoms, x may be 2 or 3, n may be about 3 to 12, and $R_5$ may be an alkyl or alkoxy group having about 1 or 2 carbon atoms or a methacryloxy group. Appropriate lithium salts, cross-linking agents, photoinitiators, and oxygen scavengers, as well as exemplary concentrations thereof in the solution, have been described previously. It is also within the scope of the invention to include additional, optional components, as described previously, in the solution. Methods for applying the solution have been described previously.

Potential Extension to Other Electrochemical Devices

Because of the structure of the electrochemical device described herein, it is possible to use it for more than just double-layer capacitors. That is, the extension to the preparation of other electrochemical devices would simply require a change in some of the constituent coating materials. Since the materials described above are preferably in roll format, it becomes a simple matter to change the coating materials being applied.

For example, a lithium battery may be prepared by utilizing as a first "web" a metallized polymer layer on which is selectively deposited a lithium compound. A liquid electrolyte may then be applied on top of the lithium compound and cross-linked to a solid form. This web now becomes the anode for the battery.

A second web may comprise a metallized polymer layer on which is selectively deposited a carbon layer, such as the electrode describes above. This composite may serve as the current collector for the battery. Manganese dioxide may be selectively deposited on the current collector and a liquid electrolyte may be applied on top of the manganese dioxide and cross-linked to a solid form. This web now becomes the cathode for the battery.

Such a construction would for allow for the high volume production of thin, light weight, flexible lithium batteries that would not have any of the drawbacks of current lithium batteries (leakage, limited high temperature, reliability, fires etc.).

The invention will best be described in conjunction with the following, non-limiting example.

EXAMPLE

Electrode Preparation and Analysis

A carbon ink electrode material was prepared using the components shown in Table 2 The electrode material was prepared by dissolving the resin in the solvent, then slowing adding the graphite with mixing to disperse it in the resin solution. The particle sizes of the agglomerated fibrils were reduced by grinding in a shaker mill containing steel media for about 15-30 minutes at a frequency of 5 Hz so that most of the particles had a length of less than 5 microns. The final viscosity of the resulting dispersion was then adjusted to about 50 to about 100 cps by adding additional solvent as needed.

The resulting ink was applied to a metallized polymer film using gravure printing and then dried using forced hot air at a temperature of about 140° F. to about 210° F. (about 60° C. to about 100° C.). The resulting thin film had a thickness of about 2 to about 4 microns.

The adhesion of the electrode to the metallized film was confirmed using the standard 810 tape test (ASTM D3359 with #810 3M Scotch Tape). Upon removal of the tape, no carbon was observed on the tape.

TABLE 2

Electrode Composition

| Component | Description | Concentration (weight %) |
|---|---|---|
| graphite material | graphite fibrils/carbon black pigment | 5 |
| Kynar 2801 | polyvinylidene fluoride (resin) | 2 |
| methylethylketone | solvent | 93 |

We claim:

1. A double layer capacitor comprising at least one double layer capacitor cell, wherein each double layer capacitor cell comprises a first and a second current collector, each current collector comprising a metallized carrier film having an upper planar surface and a lower planar surface, a first thin electrode layer in direct contact with the lower planar surface of the metallized carrier film of the first current collector, a second thin electrode layer in direct contact with the upper planar surface of the metallized carrier film of the second current collector, and a thin polymer electrolyte layer in direct contact with the first and the second thin electrode layers, wherein the polymer electrolyte is applied as a liquid which impregnates and encases the first and the second electrode layers and is then solidified to form the electrolyte layer.

2. The double layer capacitor according to claim 1, wherein the carrier film comprises a polymer.

3. The double layer capacitor according to claim 2, wherein the polymer is selected from the group consisting of polyethylene terephthalate, polyethylene naphthalate, and poly(p-phenylenesulfide).

4. The double layer capacitor according to claim 1, wherein the metallized carrier film comprises a film metallized with a metal selected from the group consisting of copper, silver, zinc, aluminum, and a metal alloy.

5. The double layer capacitor according to claim 1, wherein the metallized carrier film comprises an isolation path in at least one of the upper and lower planar surfaces.

6. The double layer capacitor according to claim 1, wherein the first and the second current collectors are positioned in an offset configuration.

7. The double layer capacitor according to claim 1, wherein the at least one double layer cell has a concentrically wound configuration.

8. The double layer capacitor according to claim 1, comprising multiple double layer capacitor cells stacked together.

9. The double layer capacitor according to claim 1, wherein the metallized carrier film comprises an edge perpendicular to the upper and lower planar surfaces, and wherein the at least one double capacitor cell further comprises a termination contacting the entire edge of the metallized carrier film, wherein the termination comprises a thermal spray of a metal.

10. The double layer capacitor according to claim 9, wherein the metal is selected from the group consisting of aluminum, copper, nickel, tin, and zinc.

11. The double layer capacitor according to claim 1, wherein each of the first and the second electrode layers independently comprises at least one material selected from the group consisting of ruthenium, molybdenum, titanium, iron, nickel, barium-titanate, and carbon.

12. The double layer capacitor according to claim 11, wherein the first and second electrode layers comprise nanocarbon graphite fibers.

13. The double layer capacitor according to claim 12, wherein the fibers have diameters of about 90 to about 200 nm and lengths of less than about 1 to about 5 microns.

14. The double layer capacitor according to claim 1, wherein each of the first and the second electrode layers has a thickness of about 1 to about 10 microns.

15. The double layer capacitor according to claim 14, wherein each of the first and the second electrode layers has a thickness of about 2 to about 5 microns.

16. The double layer capacitor according to claim 1, wherein the first and the second electrode layers are applied from an ink comprising nanocarbon graphite fibers, a resin, and a solvent, wherein the ink is printed onto the surfaces of the metallized carrier films.

17. The double layer capacitor according to claim 1, wherein the capacitor has an operating temperature of greater than about 125° C.

18. The double layer capacitor according to claim 1, wherein the at least one double layer capacitor cell has a thickness of not more than about 60 microns.

19. The double layer capacitor according to claim 1, wherein each of the first and the second current collector has a thickness of about 0.5 to about 10 microns.

20. The double layer capacitor according to claim 1, wherein the electrolyte layer comprises an electrolyte in a solid or gel state.

21. The double layer capacitor according to claim 1, wherein the at least one double layer capacitor cell further comprises a separator.

22. The double layer capacitor according to claim 1, wherein the capacitor has a capacitance of about 1 microfarad per $cm^2$ to about 1 farad per $cm^2$.

23. The double layer capacitor according to claim 1, wherein the polymer electrolyte comprises a cross-linked silane.

24. The double layer capacitor according to claim 23, wherein the cross-linked silane is formed from a compound having formula I or II:

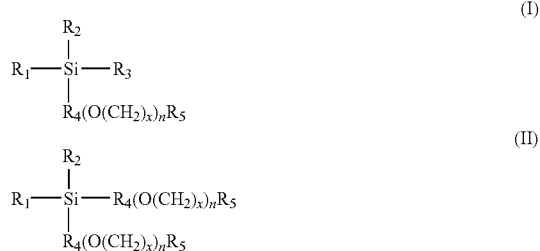

wherein $R_1$, $R_2$, and $R_3$ may be the same or different and may be linear or branched alkyl or alkyloxy groups having about 1 to about 6 carbon atoms; $R_4$ may be an alkyl group having about 1 to about 6 carbon atoms or an alkyleneoxygroup having about 3 to about 12 carbon atoms, x may be 2 or 3, n may be about 3 to 12, and $R_5$ may be an alkyl or alkoxy group having about 1 or 2 carbon atoms or a methylacryloxy group.

25. The double layer capacitor according to claim 23, wherein the cross-linked silane comprises at least one acrylate functional group.

26. The double layer capacitor according to claim 1, wherein the polymer electrolyte layer has a thickness of about 1 to about 10 microns.

27. The double layer capacitor according to claim 26, wherein the polymer electrolyte layer has a thickness of about 2 to about 5 microns.

28. The double layer capacitor according to claim 1, wherein the electrolyte layer is applied from an ink comprising a cross-linkable silane, a lithium salt, a cross-linking agent, at least one photoinitiator, and an oxygen scavenger, wherein the ink is printed onto the first and second electrode layers.

29. A method of producing a double layer capacitor comprising at least two double layer capacitor cells, the method comprising:
(a) providing a polymer film having a first and a second planar surface;
(b) metallizing each of the first and the second planar surfaces with a layer of metal to produce a current collector having an upper and a lower planar surface;
(c) applying a thin layer of an electrode to each of the first and the second planar surfaces of the current collector;
(d) applying a thin layer of a polymer electrolyte to each of the planar surfaces of the current collector and the electrode layer to produce a composite structure, wherein the electrode layers are impregnated and encased by the polymer electrolyte;
(e) stacking at least two composite structures in an off-set configuration to produce a double layer capacitor, wherein the double layer capacitor has an upper planar surface, a lower planar surface, and a perpendicular edge;
(f) applying a metal end spray termination to the perpendicular edge of the double layer capacitor; and
(g) thermally treating the double layer capacitor to stiffen the polymer films.

30. The method according to claim 29, further comprising (h) adding at least two leads to the double layer capacitor.

31. The method according to claim 29, wherein step (c) comprises applying an electrode composition comprising an electrically active material, a binder, and a solvent, and heating or drying the applied composition to remove the solvent.

32. The method according to claim 29, wherein step (c) comprises applying the layer of electrode using a process selected from the group consisting of a gravure printing process, lithography, a silk screening process, ink jet technology, and spray technology, followed by drying or heating.

33. The method according to claim 29, wherein step (d) further comprises cross-linking the polymer electrolyte layer to form a solid electrolyte.

34. The method according to claim 33, wherein the cross-linking comprises applying at least one selected from the group consisting of UV irradiation, e-beam, and heat to the polymer electrolyte layer.

35. The method according to claim 29, wherein step (d) comprises applying the layer of electrolyte using a process selected from the group consisting of a gravure printing process, lithography, a silk screening process, ink jet technology, and spray technology.

36. The method according to claim 29, wherein steps (a) to (g) are performed on a reel-to-reel basis.

37. The method according to claim 29, wherein the current collector has a thickness of about 0.5 to about 10 microns.

38. The method according to claim 29, wherein the electrode has a thickness of about 1 to about 10 microns.

39. The method according to claim 29, wherein the electrolyte has a thickness of about 1 to about 10 microns.

40. The method according to claim 29, wherein step (b) further comprises applying at least one non-metal margin area in the layer of metal.

41. The method according to claim 29, wherein step (e) comprises stacking the at least two composite structures using wound, stacked, or Interleaf® film assembly technology.

42. A method for forming a cross-linked electrolyte comprising preparing a solution comprising a cross-linkable silane having formula I or II, a lithium salt, a cross-linking agent, at least one photoinitiator, and an oxygen scavenger, applying the solution to a substrate, and applying at least one selected from the group consisting of UV irradiation, heat, and e-beam to cross-link the silane;

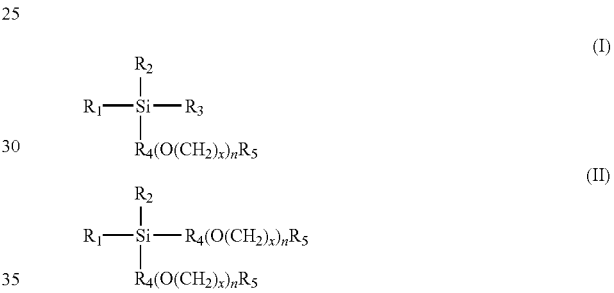

wherein $R_1$, $R_2$, and $R_3$ may be the same or different and may be linear or branched alkyl or alkyloxy groups having about 1 to about 6 carbon atoms; $R_4$ may be an alkyl group having about 1 to about 6 carbon atoms or an alkyleneoxygroup having about 3 to about 12 carbon atoms, x may be 2 or 3, n may be about 3 to 12, and $R_5$ may be an alkyl or alkoxy group having about 1 or 2 carbon atoms or a methacryloxy group.

* * * * *